Sept. 10, 1935.   J. M. COUNCIL   2,014,311
TOOL FOR TRANSPLANTING
Filed March 23, 1935
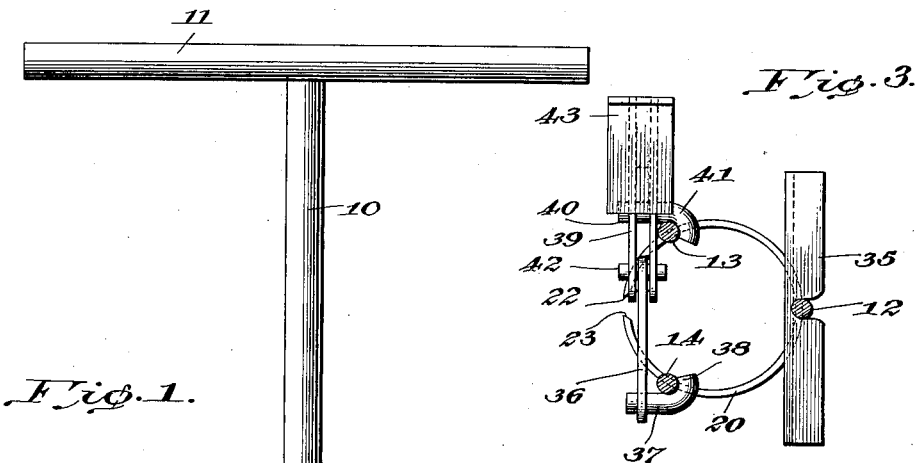
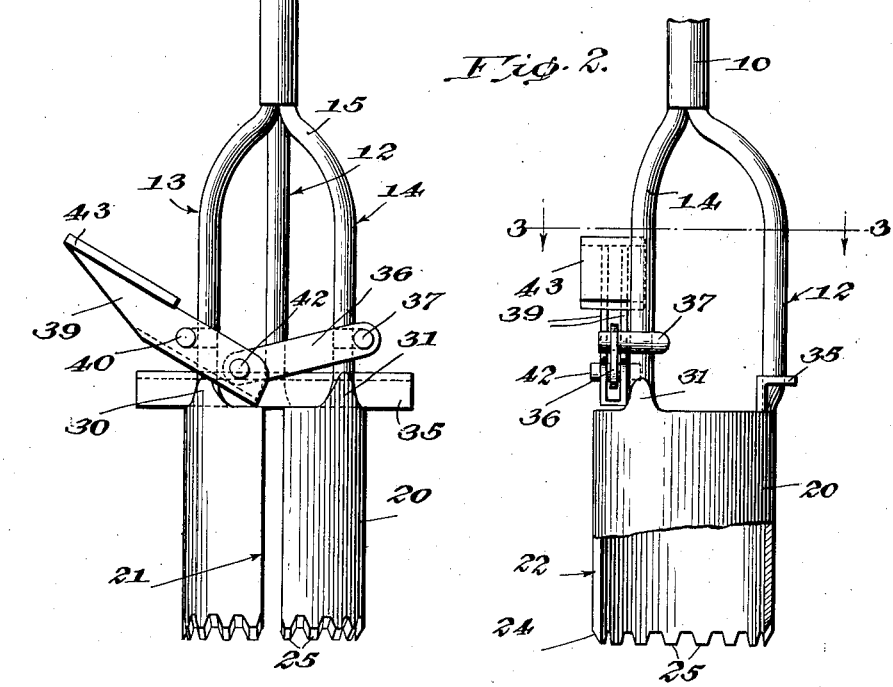
Inventor
J. M. Council,
By Munn, Anderson + Liddy
Attorneys Patented Sept. 10, 1935

2,014,311

UNITED STATES PATENT OFFICE 2,014,311

TOOL FOR TRANSPLANTING

John M. Council, Wananish, N. C.

Application March 23, 1935, Serial No. 12,722

5 Claims. (Cl. 55—18)

This invention relates to a tool for transplanting.

An object of the invention is the provision of a tool which may be forced into the ground for cutting a section of the soil around the roots of a plant or tree and for cutting the roots so that the whole may be raised by the tool and removed to another neighborhood where the tree is to be planted, said tool being employed for forming another hole of slightly larger diameter for the planting of the removed tree.

Another object of the invention is the provision of a tool for transplanting, which may not only be used for removing plants or trees with the soil around the roots held intact, but for transporting such plants or trees, the cutting or digging member being formed of expansible material with means for expanding the cutting member for releasing the roots and the soil around the plants and for removing soil from another section for transplanting trees.

A further object of the invention is the provision of a transplanting tool having a substantially cylindrical member which is split longitudinally and formed of spring metal with a lever and link connected with movable arms attached to the expansible member for expanding the split cylindrical member, the spring metal permitting contraction of the member when desired.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in elevation of a transplanting tool constructed in accordance with the principles of my invention, Figure 2 is a fragmentary view of the tool partly in section and at right angles to the view shown in Figure 1, and Figure 3 is a horizontal section taken along the line 3—3 of Figure 2.

Referring more particularly to the drawing, 10 designates a shank which is provided with a handle 11 secured thereto in any approved manner.

A plurality of arms 12, 13, and 14 are secured to the lower end of the shank 10 in any approved manner but in this instance the arms are welded to the end of the shank. These arms are bowed outwardly from the shank, as shown at 15, and thence are disposed in parallel relation downwardly for the greater portion of the length.

A substantially cylindrical member 20 is split at 21 so that the member may be expanded in a manner and for a purpose to be presently described. The split portions as shown at 22 and 23 are beveled to not only facilitate the insertion of the cylindrical member into the ground but to provide for the cutting of the soil at this point when the cylindrical member is contracted.

The lower end of the cylinder is beveled, as shown at 24, and is provided with teeth 25 if desired to facilitate the penetration of the member into the ground.

The upper end of the cylinder 20 is provided with lugs 30 and 31. The lower end of the arm 14 is connected to the lug 31 while the lower end of the arm 13 is secured to the lug 30 in any approved manner although in this instance the lugs are welded to the lower ends of said arms. The lugs 30 and 31 are disposed upon opposite sides of the split portion 21 of the cylinder. The lower end of the arm 12 is secured to the top of the cylinder at a point which is diametrically opposite to the split portion 21. The three arms are disposed at substantially an angle of 120° from each other.

A foot rest or treadle in the form of an angle iron 35 is secured to the lower end of the arm 12 but not to the upper edge of the cylinder 20. The foot rest extends upon opposite sides of the arm so that either the right or left foot may be engaged with the treadle for forcing the cylinder into the ground.

A link 36 is pivotally mounted on a pin 37 which is secured at 38 to the lower end of the arm 14. A lever 39 is pivotally mounted on a pin 40 secured at 41 to the arm 13. The inner end of the link 36 and the lever 39 are pivotally connected together at 42. The lever 39 is provided with a tread 43 which is adapted to be engaged by the foot for moving the lever and link substantially to a horizontal position for spreading the arms 13 and 14 apart for expanding the cylindrical member 20.

The operation of my device is as follows: When it is desired to remove the roots of a plant or tree from the ground the cylindrical member is placed over the tree or plant and either foot of the operator is pressed down on the member 35 whereby the member 20 is forced into the ground. It must be borne in mind, however, that before the cylindrical member is forced into the ground that the link 36 and lever 39 are placed in the position shown in Fig. 1 so that the cylindrical member is in its contracted position. The handle 11 is thence given a quarter of a turn to cut the soil whence the handle may be elevated and the tree or plant together with the soil around the roots is elevated.

Any number of the transplanting devices may be employed for removing a number of plants since the transplanting device provides a very efficient way for transporting the plants without the loss of soil from the roots and without exposing the roots to the atmosphere.

When the plant which has been removed is replanted the cylindrical member 20 is expanded by pressing upon the lever 39 whence the link 36 and the lever 39 will be moved to a horizontal position whereby the arms 13 and 14 are spread apart. This expanded condition of the cylinder 20 when forced into the ground will cut a larger hole so that when the lever 39 is raised and the arms 13 and 14 released the cylindrical member will clamp the soil therein whereby the soil may be removed to provide the hole for receiving the removed plant. The tool together with the plant is then inserted into the ground and the member 20 is expanded by the operation of the lever 39 whence the tool may be removed.

By the use of this tool it will be seen that plants may be removed from the ground and reestablished in the soil without exposing the roots at any time to the atmosphere so that it is possible to transplant trees or the like with substantially no damage to the tree or plant.

I claim:

1. A tool for transplanting comprising a split expansible cylindrical member having the lower end sharpened to cut into the soil, a shank, arms having the upper ends rigidly connected to the shank and the lower ends connected to the upper edge of the cylindrical member, means connected between a pair of the arms for forcing the lower ends of the arms apart to expand the split cylindrical member, while maintaining the other arm stationary.

2. A tool for transplanting comprising an expansible member, said member being annular and split longitudinally, a shank, spaced arms connecting the upper end of the expansible member with the shank, means for forcing a pair of the arms apart to expand the expansible member, the other arm acting as a support between the expansible member and the shank when the other arms are forced apart.

3. A tool for transplanting comprising an expansible member, said member being annular and split longitudinally, a shank, spaced arms connecting the upper end of the expansible member with the shank, means for spreading a pair of the arms and expanding the expansible member, said means including means for retaining the member in expanded condition.

4. A tool for transplanting comprising an expansible member, said member being annular and split longitudinally, a shank, spaced arms connecting the upper end of the expansible member with the shank, means for spreading a pair of the arms and expanding the expansible member, said means including means for retaining the member in expanded condition, said member having sufficient resilience to cause the member to contract when released by the last-mentioned means.

5. A tool for transplanting comprising an expansible cylindrical member having the lower end sharpened to cut into the soil, said member having a longitudinal slit, a shank, arms projecting from the shank, one of the arms being secured to the top of the member at a point which is substantially diametrically opposite the slit, the free ends of the other arms being secured to the member at each side of the slit, means for expanding the cylindrical member, a link pivotally connected at one end to one of the last-mentioned arms, a lever pivotally connected intermediate its ends thereof to the other of the last-mentioned arms, means pivotally connecting the inner ends of the levers and link so that when the link and lever are at an angle to each other the cylindrical member will be contracted, said member having sufficient resilience to cause said member to contract after expansion.

JOHN M. COUNCIL.